United States Patent
Pouzadoux et al.

(10) Patent No.: US 11,131,196 B2
(45) Date of Patent: Sep. 28, 2021

(54) LEADING EDGE SHIELD

(71) Applicant: SAFRAN AIRCRAFT ENGINES, Paris (FR)

(72) Inventors: Frédéric Jean-Bernard Pouzadoux, Moissy-Cramayel (FR); Alain Jacques Michel Bassot, Moissy-Cramayel (FR); Jérémy Guivarc'h, Moissy-Cramayel (FR); Jean-Louis Romero, Moissy-Cramayel (FR); Thibault Ruf, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 36 days.

(21) Appl. No.: 16/064,132

(22) PCT Filed: Dec. 21, 2016

(86) PCT No.: PCT/FR2016/053607
§ 371 (c)(1),
(2) Date: Jun. 20, 2018

(87) PCT Pub. No.: WO2017/109407
PCT Pub. Date: Jun. 29, 2017

(65) Prior Publication Data
US 2019/0003312 A1    Jan. 3, 2019

(30) Foreign Application Priority Data
Dec. 21, 2015   (FR) .................................. 1563007

(51) Int. Cl.
*F01D 5/14*    (2006.01)
*F01D 5/28*    (2006.01)
(Continued)

(52) U.S. Cl.
CPC ............. *F01D 5/147* (2013.01); *F01D 5/282* (2013.01); *F01D 5/288* (2013.01); *F04D 29/023* (2013.01);
(Continued)

(58) Field of Classification Search
None
See application file for complete search history.

(56) References Cited

U.S. PATENT DOCUMENTS 3,989,406 A * 11/1976 Bliss .................... F01D 5/141
415/1
4,006,999 A *  2/1977 Brantley ............... F01D 5/282
416/224

(Continued)

FOREIGN PATENT DOCUMENTS

CN   1220340 A    6/1999
DE   4411679 C1  12/1994
(Continued)

OTHER PUBLICATIONS

International Search Report dated Mar. 24, 2017, in International Application No. PCT/FR2016/053607 (7 pages).
(Continued)

*Primary Examiner* — Juan G Flores
(74) *Attorney, Agent, or Firm* — Bookoff McAndrews, PLLC

(57) ABSTRACT

A leading-edge shield for a turbomachine blade includes a pressure-side wing and a suction-side wing. Both the pressure-side wing and suction-side wing extend heightwise from a bottom edge to a top edge and lengthwise from the leading edge to a respective rear edge. They are connected together via the leading edge. The rear edge of the suction-side wing presents at least one shaped segment that is shaped in such a manner that the length of the suction-side wing (Continued)

within this segment is shorter than the length of the suction-side wing at each end of this segment.

11 Claims, 2 Drawing Sheets

(51) Int. Cl.
  *F04D 29/02* (2006.01)
  *F04D 29/38* (2006.01)
(52) U.S. Cl.
  CPC ........ *F04D 29/388* (2013.01); *F05D 2220/36* (2013.01); *F05D 2240/303* (2013.01); *F05D 2300/603* (2013.01)

(56) References Cited

U.S. PATENT DOCUMENTS

| | | | | |
|---|---|---|---|---|
| 4,944,655 A | * | 7/1990 | Merz | ........................ B64C 11/26 416/146 R |
| 2011/0229334 A1 | * | 9/2011 | Alexander | .............. F01D 5/282 416/224 |
| 2013/0101432 A1 | | 4/2013 | Harris, Jr. et al. | |
| 2014/0219808 A1 | | 8/2014 | Drozdenko et al. | |

FOREIGN PATENT DOCUMENTS

| | | | | | |
|---|---|---|---|---|---|
| EP | 2 022 942 | A1 | | 2/2009 | |
| EP | 2037082 | A1 | | 3/2009 | |
| FR | 2 994 708 | A1 | | 2/2014 | |
| GB | 1096294 | A | | 12/1967 | |
| GB | 1500776 | A | * | 2/1978 | ........... F04D 29/324 |
| GB | 2288441 | A | | 10/1995 | |
| GB | 2288441 | A | * | 10/1995 | ............. F01D 5/282 |
| GB | 2 482 247 | A | | 1/2012 | |
| JP | S52-021512 | A | | 2/1977 | |
| JP | S62-165506 | A | | 7/1987 | |
| JP | S62-165512 | A | | 7/1987 | |
| JP | H09-004405 | A | | 1/1997 | |
| JP | 2009-024695 | A | | 2/2009 | |
| JP | 2009-036192 | A | | 2/2009 | |
| JP | 2012-026448 | A | | 2/2012 | |
| JP | 2014-532112 | A | | 12/2014 | |
| RU | 2498083 | C2 | | 11/2013 | |
| WO | 2014/055499 | A1 | | 4/2014 | |
| WO | 2014143265 | A1 | | 9/2014 | |
| WO | 2014/196987 | A2 | | 12/2014 | |
| WO | 2015128575 | A1 | | 9/2015 | |

OTHER PUBLICATIONS

Official Communication issued in corresponding Russian Application No. 2018126658 dated May 29, 2020 (12 pages).

Official Communication in corresponding Japanese Patent Application No. 2018-532580, dated Dec. 1, 2020, English translation (8 pages).

Official Communication in Chinese Patent Application No. 2016800786971, dated Mar. 1, 2021, with English translation (6 pages).

Official Communication in European Patent Application No. 16831499.5, dated Mar. 10, 2021 (5 pages).

* cited by examiner

LEADING EDGE SHIELD

CROSS-REFERENCE TO RELATED APPLICATIONS

This application is the U.S. national phase entry under 35 U.S.C. § 371 of International Application No. PCT/FR2016/053607, filed on Dec. 21, 2016, which claims priority to French Patent Application No. 1563007, filed on Dec. 21, 2015, the entireties of each of which are herein incorporated by reference.

BACKGROUND OF THE INVENTION

The present invention relates to a leading-edge shield for a turbomachine blade. The term "turbomachine" is used in this context to mean any machine in which energy can be transferred between a fluid flow and at least one set of blades, e.g. such as a compressor, a pump, a turbine, a propeller, or indeed a combination of at least two of the above.

Such leading-edge shields are typically for protecting the leading edges of rotating blades or of guide vanes against impacts. The term "blades" is used in this context both for fan blades and for the blades of an aircraft propeller. In order to limit their weight, such blades are typically mainly in the form of a blade body made of a fiber-reinforced composite material having an organic matrix, e.g. made of a polymer. Although such materials present mechanical qualities that are generally very favorable, in particular compared with their weight, they are nevertheless somewhat sensitive to point impacts. Shields, typically made of very strong metal material such as titanium alloys, are thus normally installed on the leading edges of such blades, in order to protect them against such impacts. Such shields are normally in the form of a thin pressure-side wing and a thin suction-side wing joined together by a thicker section overlying the leading edge, the wings and the thicker section fitting closely to the shape of the blade on the leading edge and on the adjacent pressure-side and suction-side sections. The pressure-side and suction-side wings extend in height and in length over these pressure-side and suction-side sections respectively of the blade, and they serve mainly to ensure that the shield is positioned and fastened on the leading edge, and they also serve to distribute the force of an impact and to dissipate its energy over a larger area of the blade body. Thus, in the event of an impact against the leading-edge shield, waves of deformation propagate through the shield, including the wings, until they are completely dissipated therein. Nevertheless, under certain circumstances, such propagation can lead to deformation peaks that can go so far as to cause a wing to become partially separated.

OBJECT AND SUMMARY OF THE INVENTION

The present disclosure seeks to remedy those drawbacks by proposing a leading-edge shield for a turbomachine blade that dissipates the energy of impacts more effectively and that limits potential separation.

In at least one embodiment, this object is achieved by the fact that, in said leading-edge shield, which may be made of metal material and comprises a pressure-side wing and a suction-side wing, each extending heightwise from a bottom edge to a top edge and lengthwise from the leading edge to a respective rear edge, and connected together via the leading edge, the rear edge of the suction-side wing presents at least one shaped segment that is shaped in such a manner that the length of the suction-side wing within this segment is shorter than the length of the suction-side wing at each end of this segment.

By means of these provisions, in the event of an impact, waves of deformation propagate through the suction-side wing in such a manner as to obtain dissipation of the energy of the impact that is faster and more effective. Also, this shape additionally presents the further advantage of forming an obstacle to the suction-side wing separating starting from its top edge and/or its bottom edge.

In order to dissipate the energy of impact better, said segment of the rear edge of the suction-side wing may in particular be closer to the top edge than to the bottom edge of the suction-side wing. Also, in order to increase the dissipation effect, said rear edge of the suction-side wing may present a plurality of shaped segments that are shaped in such a manner that the length of the suction-side wing within each segment is shorter than the length of the suction-side wing at each end of the same segment.

In order to avoid force concentrations, the rear edge of the suction-side wing may present tangential continuity over the entire height of the shield, such that the length of the suction-side wing varies gradually, in particular so as to avoid curvature that is excessive, corresponding to radii of curvature smaller than some predetermined minimum.

The present disclosure also provides a blade extending heightwise from a blade root to a blade tip and comprising a blade body and such a leading-edge shield assembled to the blade body, the blade body being made of composite material having an organic matrix, e.g. a polymer matrix, reinforced by fibers, the leading-edge shield being made of a material with betterpoint impact resistance than the composite material of the blade body.

In this blade, the leading edge may in particular present, at least locally, back sweep equal to or greater than 30°, for better aerodynamic efficiency. The shape of the rear edge of the suction-side wing is particularly useful for dissipating impacts in the proximity of the leading edge of a blade that presents such back sweep.

The present disclosure also provides a turbomachine having a plurality of such blades, a fan having a plurality of such blades, and a turbofan including such a fan.

BRIEF DESCRIPTION OF THE DRAWINGS

The invention can be well understood and its advantages appear better on reading the following detailed description of embodiments shown as nonlimiting examples. The description refers to the accompanying drawings, in which.

DETAILED DESCRIPTION OF THE INVENTION

Figure 1:
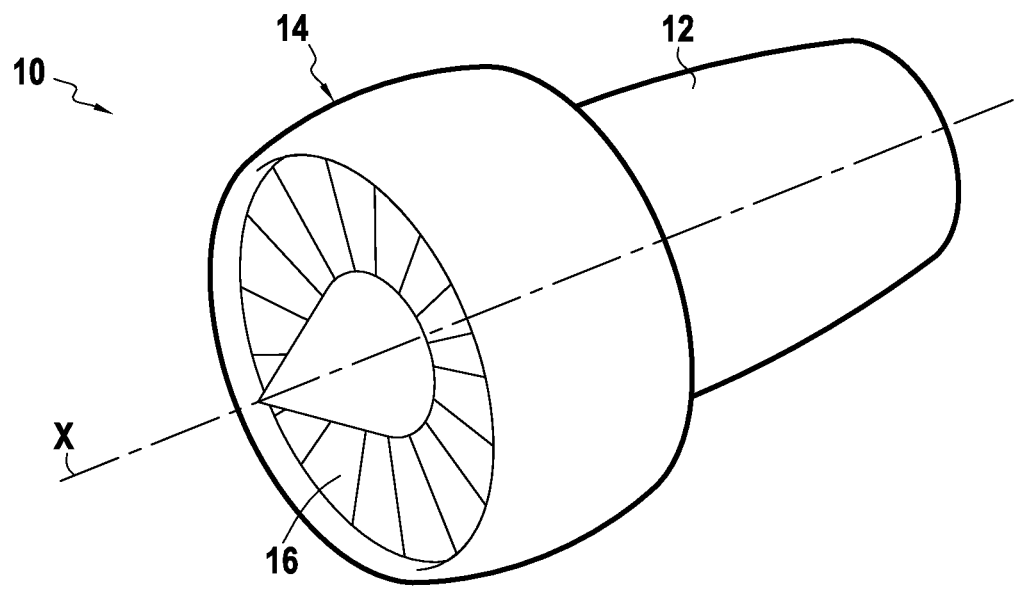
FIG. 1 is a diagrammatic perspective view of a turbofan.
Figure 2:
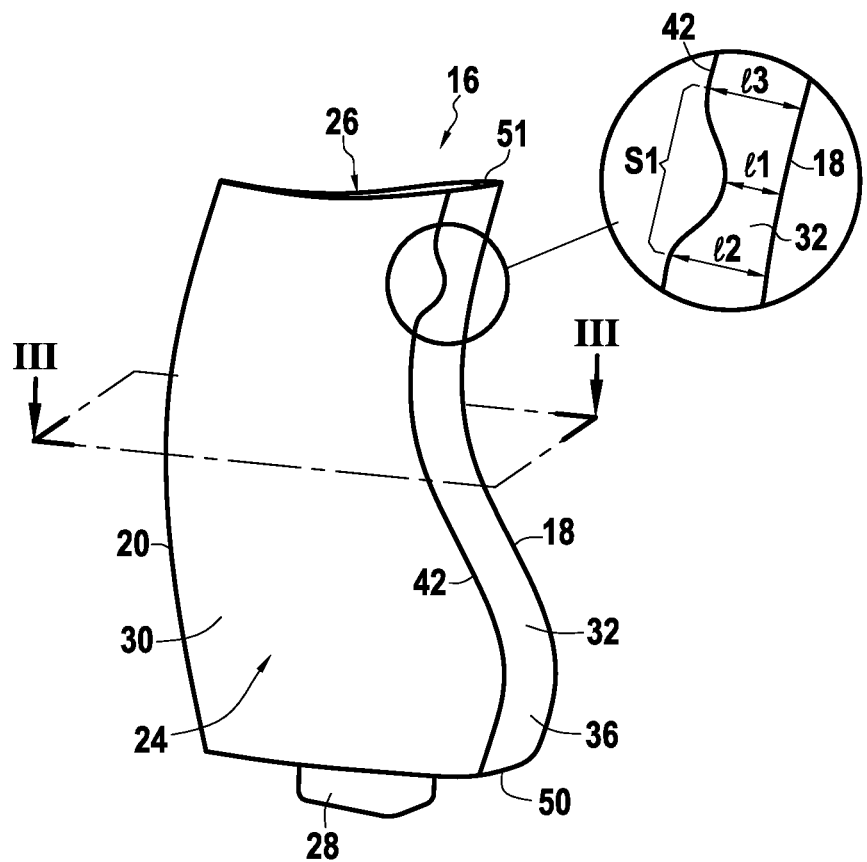
FIG. 2 is a diagrammatic perspective view of the suction side of a rotary blade of the fan of the FIG. 1 turbojet, in a first embodiment of the blade.

FIG. 1 shows a turbofan 10 having a gas generator unit 12 and a fan 14. The fan 14 has a plurality of rotary blades 16 arranged radially around a central axis X, the blades being aerodynamically profiled so as to impel air when they rotate. Thus, as shown in FIGS. 2 and 3, each blade 16 presents a leading-edge 18, a trailing edge 20, a pressure side 22, a suction side 24, a blade tip 26, and a blade root 28.

In normal operation, the relative airflow is oriented substantially towards the leading edge 18 of each blade 16. Thus, the leading edge 18 is particularly exposed to impacts. In particular when the blade 16 comprises a blade body 30 made of composite material, in particular having a polymer matrix reinforced by fibers, it is appropriate to protect the leading edge 18 with a leading-edge shield 32 integrated in each blade. In other words, the leading-edge shield 32 is assembled on the blade body 30.

The leading-edge shield 32 is made of a material that is better at withstanding point impacts than is the composite material of the blade body 30. The leading-edge shield 32 is made mainly of metal, and more specifically out of a titanium-based alloy such as TA6V (Ti-6Al-4V), for example. The leading-edge shield 32 could equally well be made of steel or of the metal alloy commonly referred to by the registered trademark Inconel™. The term "Inconel" is used below to refer to an alloy based on iron alloyed with nickel and chromium.

Figure 3:
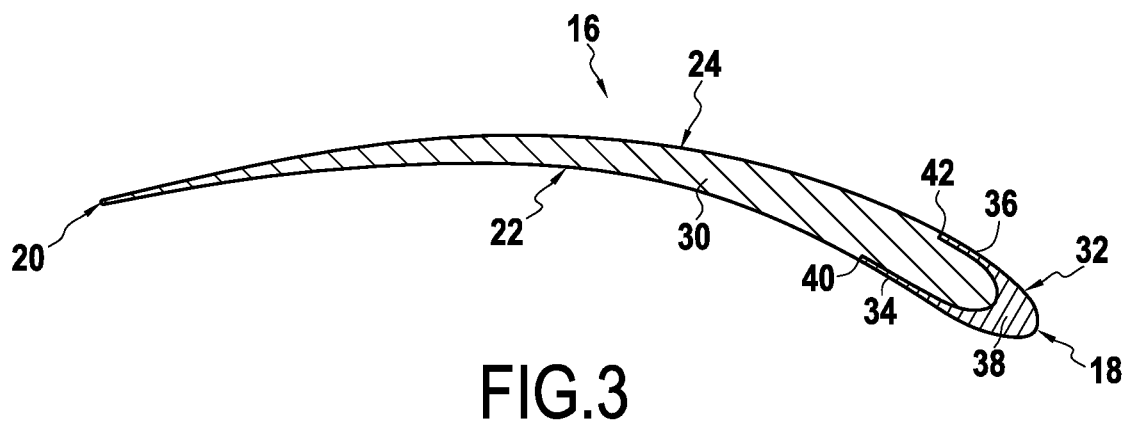
FIG. 3 is a fragmentary section view of the blade of FIG. 2 on plane III-III.

As shown in particular in FIG. 3, the leading-edge shield 32 has a pressure-side wing 34, a suction-side wing 36, and a central section 38 of greater thickness that is to overlie an edge of the blade body 30 and that connects together the pressure-side wing 34 and the suction-side wing 36 at the leading edge 18. The pressure-side and suction-side wings 34 and 36 serve both to position the shield 32 on the blade body 30, and also to dissipate impact energy. Each of the pressure-side and suction-side wings 34, 36 extends heightwise over a height H from a bottom edge 50 to a top edge 51, and lengthwise from the leading edge 18 to the corresponding rear edge 40, 42.

In order to dissipate better the energy of waves of deformation propagating through the shield 32 as the result of an impact, the rear edge 42 of the suction-side wing is not parallel to the leading edge 18 over its entire length, but instead presents a shaped segment S1 closer to the top edge 51 than to the bottom edge 52, e.g. beyond at least 60% of the height H of the shield 32 starting from the bottom edge 50, which segment is shaped in such a manner that the length n of the suction-side wing 36 within this segment is shorter than the length l2, l3 of the suction-side wing 36 at each end of this segment 52. The length n can thus be made shorter than each of the lengths l2, l3 by at least 10%, or 15%, or even 30%. Not only does this local reduction in the length of the suction-side wing 36 facilitate dissipating impact energy by making the propagation of waves of deformation over the suction-side wing more complicated, but it also contributes to preventing any local separation of the shield 32 from propagating along the rear edge 42.

Figure 4:
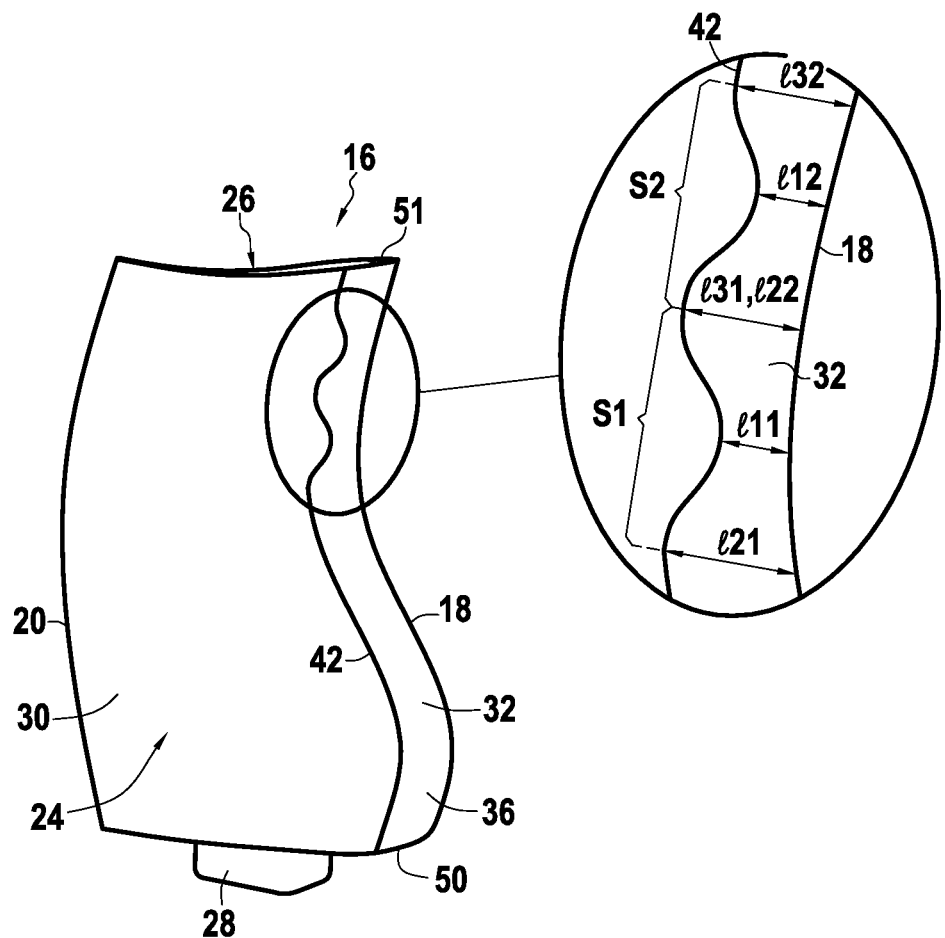
FIG. 4 is a diagrammatic perspective view of the suction side of a rotary blade of the fan of the FIG. 1 turbojet, in a second embodiment of the blade.

Although in this first embodiment, the rear edge 42 presents only one segment S1 formed in such a manner that the length n of the suction-side wing 36 within this segment is shorter than the length l2, l3 of the suction-side wing 36 at each end of this segment S1, it is also possible to envisage combining a plurality of such segments in succession in order to reinforce their effects. Thus, in a second embodiment, shown in FIG. 4, the rear edge 42 of the suction-side wing 36 presents two successive segments S1 and S2 formed in such a manner that the length n1, n2 of the suction-side wing 36 within each segment S1, S2 is shorter than the length l21, l22, l31, l32 of the suction-side wing 36 at each end of the same segment S1, S2. The remaining elements of the shield 32 and of the blade 16 in this second embodiment are all analogous to those of the first embodiment, and consequently they are given the same reference numbers in the drawing.

Although the present invention is described with reference to a specific embodiment, it is clear that various modifications and changes can be undertaken on those embodiments without going beyond the general ambit of the invention as defined by the claims. Also, individual characteristics of the various embodiments mentioned may be combined in additional embodiments. Consequently, the description and the drawings should be considered in a sense that is illustrative rather than restrictive.

The invention claimed is:

1. A leading-edge shield for a turbomachine blade, said leading-edge shield comprising a pressure-side wing and a suction-side wing, each extending heightwise from a bottom edge to a top edge and lengthwise from a leading edge to a respective rear edge, and connected together via the leading edge, and wherein the rear edge of the suction-side wing presents tangential continuity over an entire height of the leading-edge shield and at least one shaped segment that extends with tangential continuity between two rounded ends and is shaped in such a manner that any length of the suction-side wing within the at least one shaped segment is shorter than a length of the suction-side wing at each rounded end and outside of the at least one shaped segment, wherein the at least one shaped segment of the rear edge of the suction-side wing is closer to the top edge than to the bottom edge of the suction-side wing.

2. The leading-edge shield according to claim 1, wherein the length of the suction-side wing within the at least one shaped segment is at least 10% shorter than the length of the suction-side wing at each rounded end of the at least one shaped segment.

3. The leading-edge shield according to claim 2, wherein the length of the suction-side wing within the at least one shaped segment is at least 15% shorter than the length of the suction-side wing at each rounded end of the at least one segment.

4. The leading-edge shield according to claim 3, wherein the length of the suction-side wing within the at least one shaped segment is at least 30% shorter than the length of the suction-side wing at each rounded end of the at least one shaped segment.

5. The leading-edge shield according to claim 1, wherein said rear edge of the suction-side wing presents a plurality of shaped segments that are shaped in such a manner that the length of the suction-side wing within each shaped segment is shorter than the length of the suction-side wing at each rounded end of the same shaped segment.

6. The leading-edge shield according to claim 1, made of metal material.

7. A blade extending heightwise from a blade root to a blade tip and comprising a blade body and a leading-edge shield according to claim 1 assembled on the blade body, the blade body being made of fiber-reinforced organic matrix composite material, and the leading-edge shield being made of metal.

8. The blade according to claim 7, wherein the leading edge presents back sweep equal to or greater than 30°.

9. A turbomachine including a plurality of blades, each of the blades according to claim 7.

10. A fan including a plurality of blades, each of the blades according to claim 7.

11. A turbofan including a fan according to claim 10.

* * * * *